US008027761B1

(12) United States Patent
Nelson

(10) Patent No.: US 8,027,761 B1
(45) Date of Patent: Sep. 27, 2011

(54) LOCAL POSITIONING SYSTEM FOR AUTOMATED LAWN MOWERS

(76) Inventor: Russell G. Nelson, Cane Hill, AR (US)

( * ) Notice: Subject to any disclaimer, the term of this patent is extended or adjusted under 35 U.S.C. 154(b) by 629 days.

(21) Appl. No.: 12/218,825

(22) Filed: Jul. 18, 2008

Related U.S. Application Data

(60) Provisional application No. 60/967,316, filed on Sep. 4, 2007.

(51) Int. Cl.
  *G01S 3/80* (2006.01)
  *G01C 21/00* (2006.01)
(52) U.S. Cl. ............. 701/23; 701/300; 701/50; 180/168
(58) Field of Classification Search .................. None
  See application file for complete search history.

(56) References Cited

U.S. PATENT DOCUMENTS

| | | | |
|---|---|---|---|
| 5,011,288 A | 4/1991 | Noji et al. | |
| 5,491,670 A * | 2/1996 | Weber | ........................... 367/127 |
| 5,495,427 A | 2/1996 | Puma et al. | |
| 5,758,298 A | 5/1998 | Guldner | |
| 5,904,725 A | 5/1999 | Iisaka | |
| 5,940,346 A | 8/1999 | Sadowski et al. | |
| 5,955,973 A | 9/1999 | Anderson | |
| 5,956,250 A | 9/1999 | Gudat et al. | |
| 5,974,347 A | 10/1999 | Nelson | |
| 6,009,358 A | 12/1999 | Angott et al. | |
| 6,157,592 A | 12/2000 | Kriz et al. | |
| 6,255,793 B1 | 7/2001 | Peless et al. | |
| 6,393,360 B1 | 5/2002 | Ma | |
| 6,445,344 B1 | 9/2002 | Wise et al. | |
| 6,493,458 B2 | 12/2002 | Yasui et al. | |
| 6,556,942 B1 | 4/2003 | Smith | |
| 6,590,834 B1 | 7/2003 | Highfill | |
| 6,674,687 B2 | 1/2004 | Zeitzew | |
| 6,748,224 B1 | 6/2004 | Chen et al. | |
| 6,995,708 B2 | 2/2006 | Schmidt | |
| 2005/0137748 A1 * | 6/2005 | Kim | .............................. 700/245 |

FOREIGN PATENT DOCUMENTS

| | | | |
|---|---|---|---|
| EP | 0492015 A1 * | 7/1992 | |
| WO | WO 01/34264 A1 * | 5/2001 | |

OTHER PUBLICATIONS

J. Borenstein, H.R. Everett, and L. Feng, "Where Am I" Sensors and Methods for Mobile Robot Positioning, Apr. 1996, pp. 5-11, 95-98, 151-155, 171-172, University of Michigan.

* cited by examiner

*Primary Examiner* — Michael J. Zanelli

(57) ABSTRACT

An improved local positioning system (10) utilizing two fixed sonic transmitters (16A,16B) and an omni directional audio receptor (20) mounted on an automated lawn mower (12). Distance between each audio transmitter and the mower is measured by transmitting an RF trigger pulse (88) from the mower to each of the sonic transmitters. Upon being triggered, the first transmitter (16A) sends out an audio pulse which is received by an audio sensor, condenser microphone (22) and the time it takes is measured by a counter (62). Likewise the second transmitter (16B) is later triggered and the time it takes that pulse to be received is measured by the counter (62). The counts are converted to distances and the x-y coordinate which is the location of the mower is calculated by simple trigonometry. The location data which is relative to the sonic transmitters (16A,16B) is available to the microprocessor computer board (72) which utilizes the information to output control signals to a steering and control interface (74). A temperature sensor (76) is also read by the computer to adjust the distance calculation according to those conditions. With the location information, the computer (72) can be programmed to record a path as the mower (12) moves by manual remote control or operate in automatic mode to follow a previously recorded path.

3 Claims, 7 Drawing Sheets

Given distances D, d1 and d2, angle C can be calculated from the law of cosines:

$$C = \arccos[(D^2 + d2^2 - d1^2)/(2*D*d2)]$$

since $\sin(C) = x/d1$;  $x = d1 \sin(C)$ and $\cos(C) = y/d1$;  $y = d1 \cos(C)$

US 8,027,761 B1

LOCAL POSITIONING SYSTEM FOR AUTOMATED LAWN MOWERS

CROSS-REFERENCES TO RELATED APPLICATIONS

This application claims the benefit of provisional patent application Ser. No. 60/967,316 filed Sep. 4, 2007, submitted by Russell G. Nelson.

BACKGROUND

1. Field of Invention

This invention relates to local positioning systems, specifically to an improved local positioning system (LPS) for automated lawn mowers.

2. Discussion of Prior Art

Local positioning systems are known in the art. In my U.S. Pat. No. 5,974,347 (1999) I describe an automatic location system using three radio frequency (RF) transmitters to define circle equations which are solved simultaneously to determine the location of the mower. This approach requires accurate rotation control of a loop antenna and suffers from RF reflections that cause errors in measuring the angles used in the calculations. Also the transmitters had to have separate frequencies to identify them, and the figure-8 pattern of the directional antenna necessitated a sequencing circuit to verify sequences of the nulls received.

The problem of locating mobile platforms or robots simply and effectively has been attempted and partially solved by many different approaches. The techniques include dead reckoning, heading, ground-based RF beacons, and the GPS system. Time-of-flight (TOF) systems using audio, ultrasonic, and laser-based components have been used. Inertial navigation, active beam navigation systems, and optical positioning systems are used with triangulation and trilateration methods. Also landmark navigation with natural and artificial landmarks with visioning systems have been used.

The general problem of locating a mobile robot in its environment has not had a simple solution. Technical leaders in industry have been approached with the question of how to solve this problem cost effectively and were unable to come up with an answer.

U.S. Pat. No. 6,009,358 to Angott, et al. (1999) describes a programmable lawn mower using coded RF and audio signals. Coded signals are sent from the carriage or vehicle to each of the locating transmitters which send an acknowledgement, requiring a processor for codification and identification, adding to the complexity of the system. The signals from locating transmitters are continuous signals that may have interference from reflections from objects in the area causing errors and malfunctions. Further, the use of two microphones closely spaced on the vehicle to give angular position relative to the locating transmitter is not as accurate as utilizing a given greater distance between two locating transmitters.

U.S. Pat. No. 5,940,346 to Sadowski et al. (1996) describes a modular robotic platform with an acoustic navigation system. It requires three or more beacons, different RF frequencies per each beacon, a pseudo-noise generator, continuous wave acoustic signals, uses pulse modulation of the RF signal, requires advanced beacon design for accurate detection of the acoustic signal. It also suffers from Doppler frequency shift of the acoustic signal that must be taken into account.

A method of using acoustical signals to measure distance is given by Highfill in U.S. Pat. No. 6,590,834 (2003). This is applied to measuring the location of a rover carried by an individual in making surveying measurements in wooded areas. The method of determining distance uses an RF and an acoustic transmitter on the rover to transmit pulses to an array of receiver pods. Multiple pods are required to acquire data to be able to calculate the position of the rover.

U.S. Pat. No. 6,445,344 to Wise, et al. (2002), describes a local area positioning system utilizing multiple platforms in communication with each other in a local area network. It is similar to a global positioning system but on a more limited space providing three dimensional location of sensor platforms such as aircraft which would be an expensive, complex, and cumbersome system if applied to small moving vehicles such as an automated lawn mower.

U.S. Pat. No. 6,674,687 to Zeitzew (2004), uses a system and method for navigation using two-way ultrasonic positioning. However, the RF and ultrasonic signals are encoded and the two-way travel of the ultrasonic signal adds to the complexity of the system. The use of ultrasonic frequencies also has more attenuation in the air than lower audio frequencies.

U.S. Pat. No. 6,157,592 to Kriz, et al. (2000), discloses a three dimensional acoustic position determining system. It requires at least three transmitters, each coded for identification, and also requires a synchronization signal. The application is for determining the position of a receiver mounted on a person or object.

A method of measuring azimuth and distances from a moving platform and stationary reflectors is proposed by Noji, et al. in U.S. Pat. No. 5,011,288 (1991). The angle between adjacent reflectors is measured to calculate the azimuth. But the difficulty in measuring distances by phase differences in transmitted and reflected beams is that it requires a coherent light source something like a laser light emitting diode. Accurately measuring the phase difference is difficult, and also a minimum of three reflectors is required.

U.S. Pat. No. 6,995,708 to Schmidt (2006) describes a local positioning system to locate a cell phone user by sniffing earth based media and using bluetooth standards and GPS. Another system to locate a person with a cell phone is given in U.S. Pat. No. 6,748,224 to Chen, et al. (2004) describing a software implementation of a local positioning system It uses the radio propagation parameters in the CDMA and TDMA links of a cell phone system to establish the position of a digital cell phone.

U.S. Pat. No. 6,255,793 to Peless et al.(2001) describes a navigation method for autonomous machines using proximity sensors and markers defining a perimeter of the working area.

U.S. Pat. No. 5,956,250 to Gudat et al. (1999) describes a vehicle navigation system using VPS, GPS, and MPS. It includes accelerometers, gyros, odometers and Kalman filters, making a very complex and hence expensive system.

U.S. Pat. No. 5,758,298 to Guldner (1998) describes an autonomous navigation system for a mobile robot or manipulator and guides a robot to a predetermined point, for a transport or cleaning system. It uses a robot coordinate system for collision avoidance.

U.S. Pat. No. 5,495,427 to Puma et al. (1996) describes an ultrasonic position and orientation tracking system for monitoring articles in close proximity such as a pilot's helmet in a cockpit.

U.S. Pat. No. 6,393,360 to Ma (2002) is about a system for locating and directing a vehicle such as an automobile. It is a local positioning system assisting a driver in reaching their destination.

U.S. Pat. No. 5,955,973 to Anderson (1999) describes a field navigation system for navigating a farm vehicle in an agricultural field using a GPS system.

Local positioning apparatuses or systems described in U.S. Pat. No. 5,904,725 to Iisaka (1999), and 6,493,458 to Yasui, et al. (2002) relate to determining the position of a vehicle in traffic and traffic safety. These do not relate to locating an automatic lawn mower or roving platform.

U.S. Pat. No. 6,556,942 to Smith (2003) shows a short range indoor radiolocation system allowing the location of an item provided with an RF tag.

Other Publications:

Navigating Mobile Robots: Systems and Techniques by J. Borenstein, H. R. Everett, and L. Feng. Publisher: A. K. Peters, Ltd., Wellesley, Mass. c 1996. ISBN 156881058X oclc Number ocm34149992. This book surveys the state of the art in technologies used by a mobile robot to determine its position in the environment. Two groups are categorized: relative and absolute position measurements. Relative measurements include odometry and inertial navigation. Absolute measurements comprise active beacons, landmark recognition, and model matching. The most important result from this survey of mobile robot positioning is that there is no truly elegant solution for the problem.

Most sensors used for map building involve distance measurement. Three approaches are common: measuring time of flight (TOF) of a pulse of emitted energy traveling to a reflecting object, then echoing back to a receiver; phase-detection using continuous wave transmission; and frequency-modulated (FM) radar.

Potential sources of error for TOF systems include 1) variations in speed of propagation, 2) uncertainties in determining the exact time of arrival of the reflected pulse, 3) inaccuracies in timing circuitry, and 4) interaction of the incident wave with the target surface.

Detection uncertainties that were discussed relate to detecting a reflected pulse similar to a radar pulse.

While the inventors of the above LPS systems have made attempts to solve the problem of locating an automated lawn mower or moving platform, the prior art methods have failed to provide an elegant, simple, and satisfactory method required. There is a continuing need for improvements to such local positioning systems. In this respect, the present invention addresses that need.

Objects and Advantages

In all embodiments of this local positioning system (LPS), there is no use of reflected pulses hence this is not a problem. Also, variations in speed of propagation of sound caused by temperature differences can be taken into account and corrected by software. Circuitry inaccuracies are well below variations of the slow speed of sound in air so this is not a problem. Surface interaction does not apply because reflected energy is not utilized. It uses only a one-way travel of a sonic pulse that has the advantage of not being affected by specular reflection of an object's surface, and only the incident pulse is used for detection. Reflections from objects are not detected because they arrive later than the original incident pulse and thus have no effect. The disadvantages of the prior art are solved by my present LPS system, reducing the complexity, increasing reliability, and making it easier to manufacture.

Accordingly, several objects and advantages of some embodiments of the present LPS system are:

(a) To provide a simpler method of determining location employing fewer components and transmitting devices.

(b) To provide higher reliability by having fewer moving parts.

(c) To eliminate problems caused by specular audio reflections and RF reflections that interfere with depth of null measurements that use rotating loop antennas.

(d) To improve accuracy by measuring a one-way time of travel of an acoustic wave instead of an RF null.

(e) To eliminate the need for a sequencing circuit (f) To reduce the amount of circuitry needed by eliminating the unique frequencies needed for RF triggering transmitters.

(g) To reduce the amount of complex mathematics needed to calculate coordinates by using simple trigonometric formulas instead of simultaneous solutions of circle equations.

(h) To overcome the time limitation for digitally pulsing the RF transmitter to trigger the locating sonic transmitters by frequency shift keying (FSK) the RF signal between two different analog modulating frequencies.

(i) To trigger the first locating transmitter on the leading edge of the FSK signal, and the second locating transmitter on the lagging edge.

(j) To shield and isolate the omni-directional sonic sensor from ambient noise as well as vibrations from the mechanics of a lawn mower.

(k) To eliminate coding of signals requiring identification by a processor.

(l) To eliminate interference of audio reflections from objects in the area.

(m) To reduce the number of beacons or locating transmitters required and eliminate the effect of Doppler frequency shift.

(n) To simplify the system by keeping it a two-dimensional instead of a three-dimensional location of sensor platforms, and by utilizing only a one-way travel of sonic signals instead of two-way travel.

(o) To eliminate separate synchronization signals.

(p) To provide a self-contained system that does not rely on bluetooth standards, GPS, or radio propagation parameters used in cell phone systems.

(q) To obviate the use of proximity sensors and markers to define working area perimeters.

(r) To reduce the complexity by eliminating accelerometers, odometers, gyros, and GPS systems.

Further objects and advantages are to provide digital information that can be used to easily calculate the location of a roving vehicle and in particular an automated lawn mower. The system must be rugged and easy to manufacture and inexpensive for the consumer. Still further objects and advantages will become apparent from the ensuing description and drawings.

DESCRIPTION OF DRAWINGS

In the drawings, closely related figures have the same number but different alphabetic suffixes.

REFERENCE NUMERALS IN DRAWINGS

| | |
|---|---|
| 10 | overall local positioning system |
| 12 | remote control mower |
| 14 | manual remote controller |
| 16A | sonic transmitter T1 |
| 16B | sonic transmitter T2 |
| 18 | RF transmitter ground plane |
| 20 | sonic sensor assembly |
| 22 | condenser microphones |
| 24 | RF transmitter antenna |
| 26 | audio concentrator flange |
| 28 | upper foam separator |
| 30 | lower foam separator |
| 32 | support |
| 34 | upper platform |
| 36 | middle platform |
| 38 | lower platform |
| 40 | RF receiving antenna |
| 42 | pulse generator board |
| 44 | audio transducer |
| 46 | battery |
| 48 | power switch |
| 50 | acoustic separators |
| 52 | operator control panel |
| 54 | oscillator 1 |
| 56 | pulse generator |
| 58 | RF transmitter |
| 60 | oscillator 2 |
| 62 | counter |
| 66 | amplifier/filter/detector |
| 68 | latch |
| 72 | computer board |
| 74 | steering/control interface |
| 76 | temperature sensor |
| 78 | pressure sensor |
| 80 | coordinate data outputs |
| 82 | RF receiver |
| 84 | audio pulse generator |
| 88 | RF pulse |
| 90 | audio pulse of T1 |
| 92 | audio pulse of T2 |
| 94 | RF pulse to T1 |
| 96 | RF pulse to T2 |

SUMMARY

In accordance with one embodiment a local positioning system comprises a means of measuring the distance from each of a set of sonic transmitters to the automated lawn mower. That information along with ambient temperature is provided to a processor to calculate the position of the mower and enable it to navigate and follow a prescribed path.

DESCRIPTION

FIGS. 1 to 4

Figure 1:
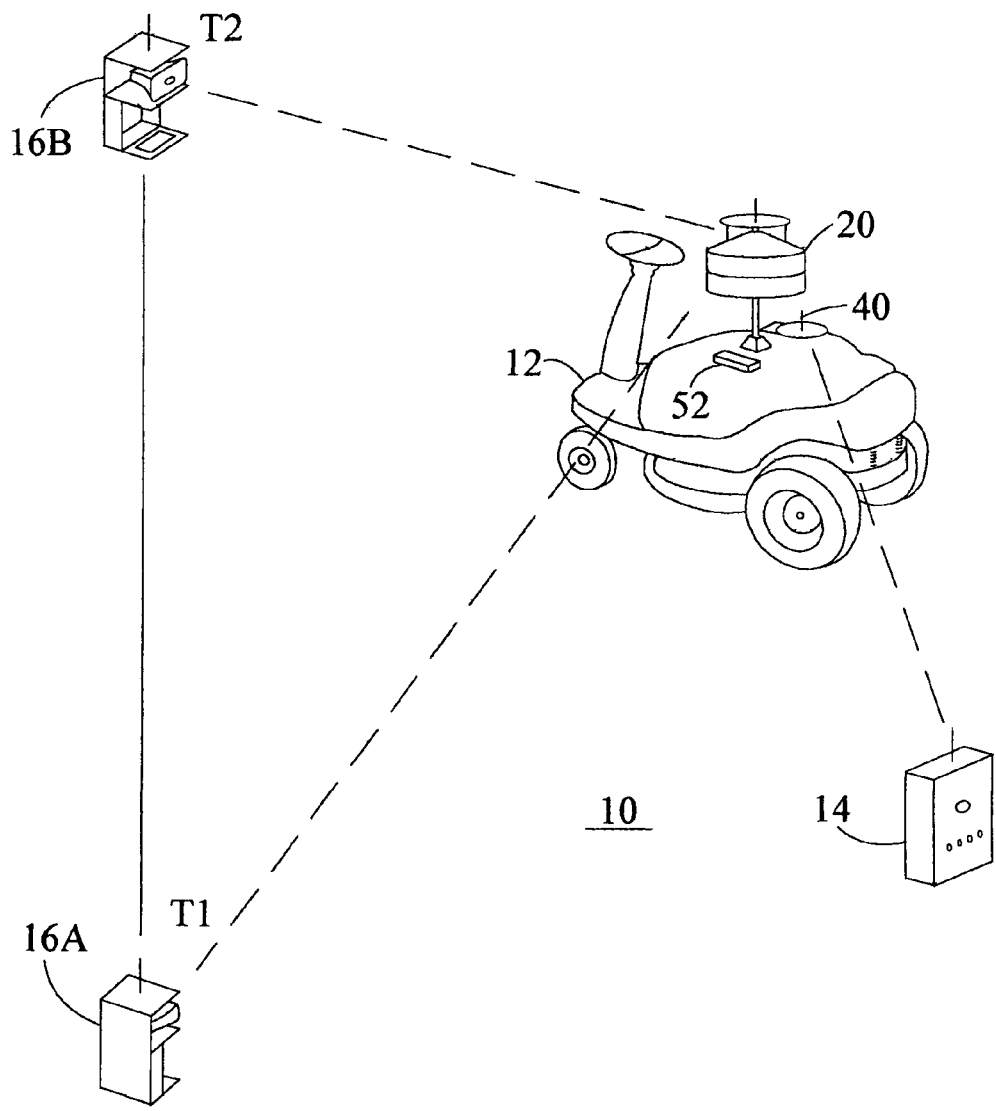
FIG. 1 shows a perspective view of the local positioning system (LPS) integrated into an automated lawn mower.

A typical embodiment of the present invention is illustrated in the perspective view of FIG. 1. The basic components of a system 10 include a remote control mower 12, a pair of audio, sound, or locating sonic transmitters 16A and 16B, and a hand-held remote controller 14, a radio frequency (RF) receiving antenna 40, a sonic sensor assembly 10 mounted on mower 12, and an operator control panel 52 also mounted on mower 12.

Figure 2:
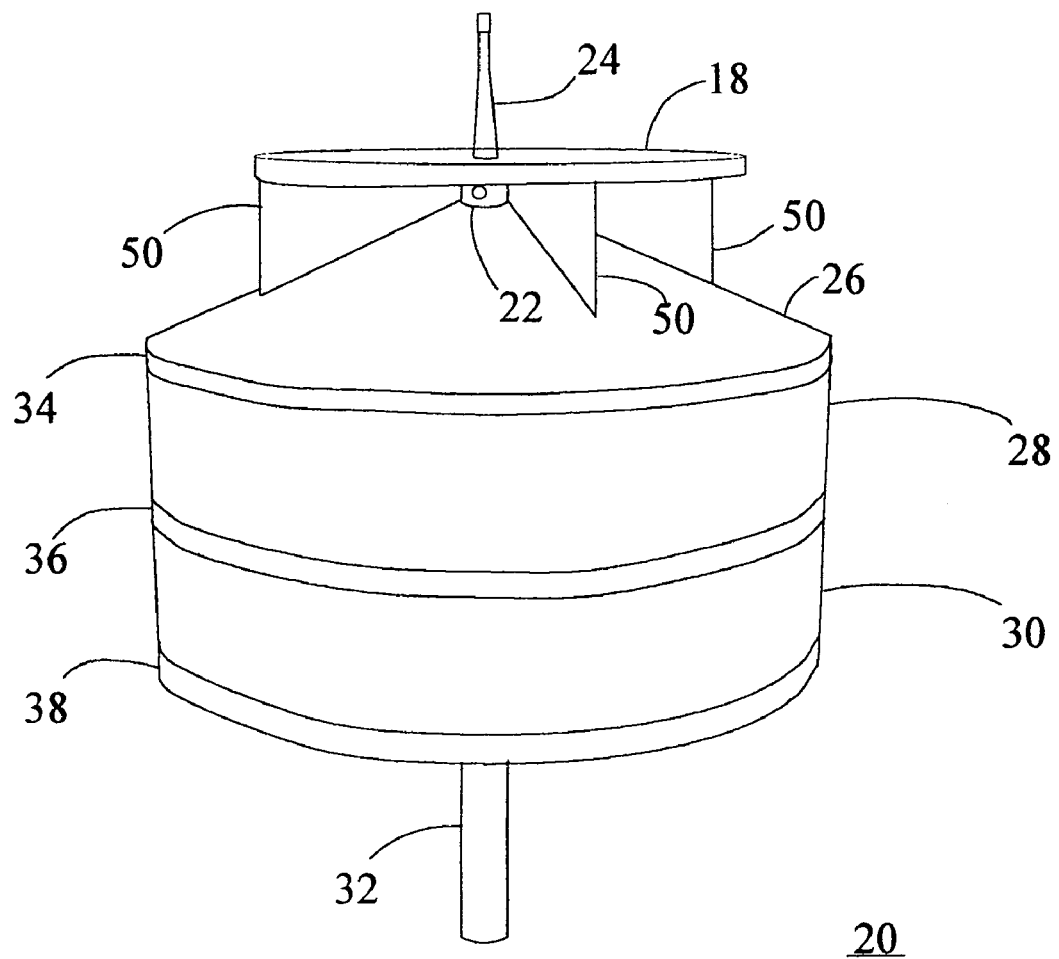
FIG. 2 shows a perspective view of the sonic sensor assembly.

FIG. 2 shows the sonic sensor assembly 20. The radio frequency (RF) transmitting antenna 24 is mounted centrally on a circular ground plane 18. The ground plane 18 is supported by a plurality of thin, vertical metal or plastic separators 50 that are affixed to a conical audio concentrator flange 26. A plurality of audio sensors, condenser microphones 22 arranged in a circle is attached between ground plane 18 and concentrator flange 26. Flange 26 is attached to an upper platform 34 that is supported by and sandwiched to a middle platform 36 with an intervening sound and vibration absorbing material upper foam separator 28. Likewise middle platform 36 is supported by and sandwiched to a lower platform 38 with a lower foam separator 30. Lower platform 38 is attached to a support 32 that mounts to a convenient place on top of remote control mower 12 not shown in this figure.

Figure 3:
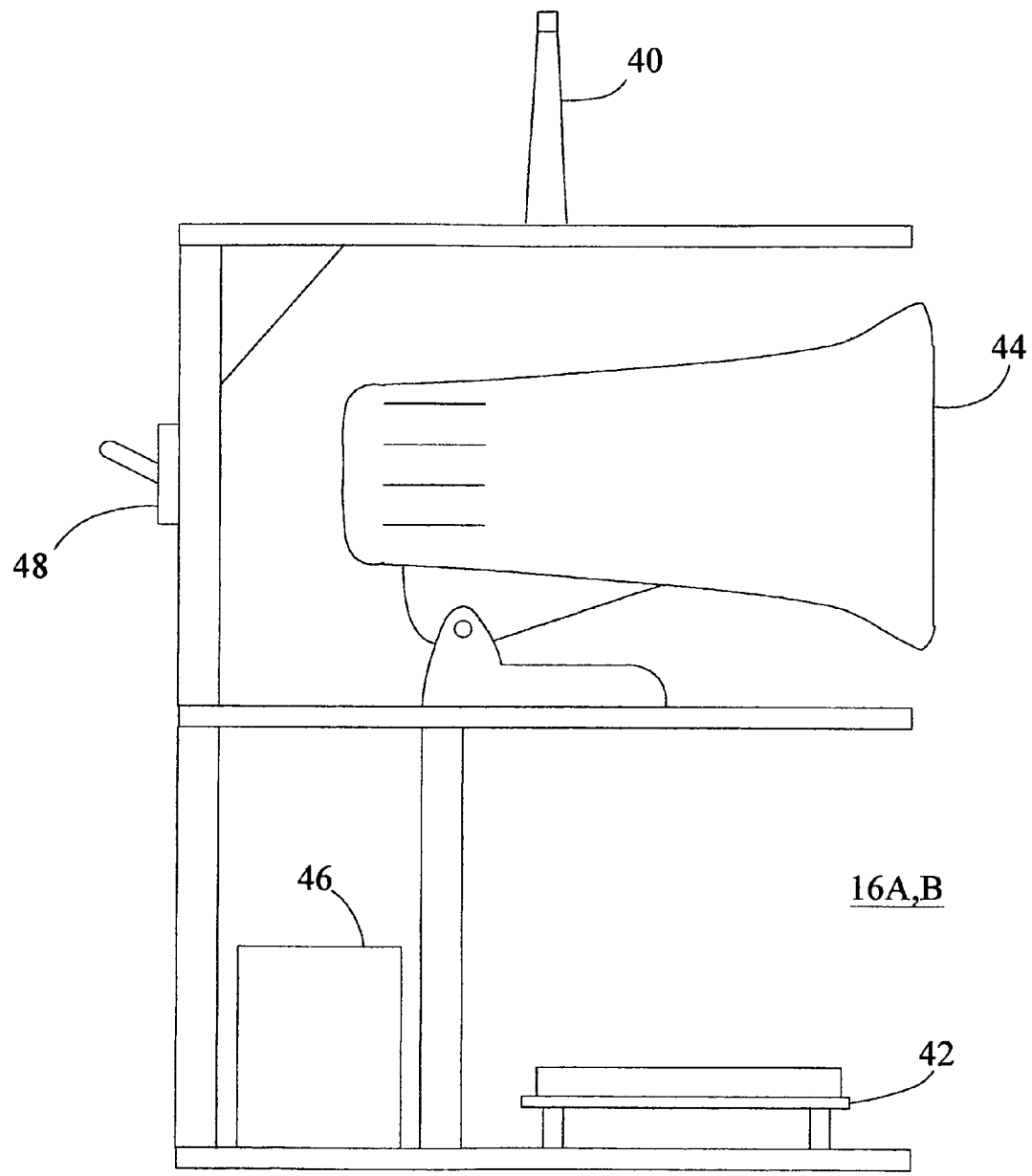
FIG. 3 shows a side view of one of two identical sonic transmitters.
Figure 6:
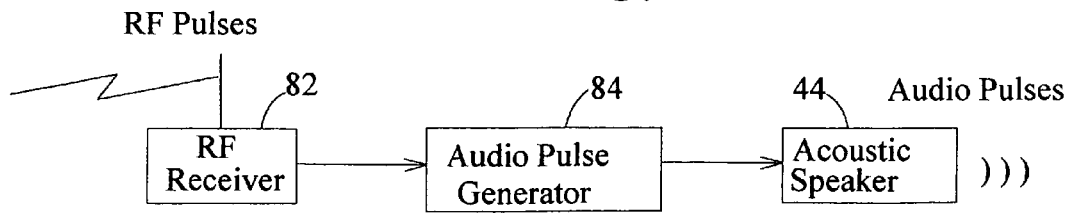
FIG. 6 is a functional diagram of the sonic transmitters T1 and T2.

FIG. 3 shows the primary components of the sonic transmitters 16A and 16B. An RF whip receiving antenna 40 is mounted on top of sonic transmitters 16A and 16B. An RF receiver 82 shown in FIG. 6 is contained on an audio pulse generator board 42 mounted on the bottom of the sonic transmitter 16. A battery 46 sets behind pulse generator board 42. A power switch 48 is mounted on the rear of the sonic transmitter 16 assembly. A speaker, audio transducer 44, is mounted on a shelf over the pulse generator board 42 and battery 46.

Figure 4:
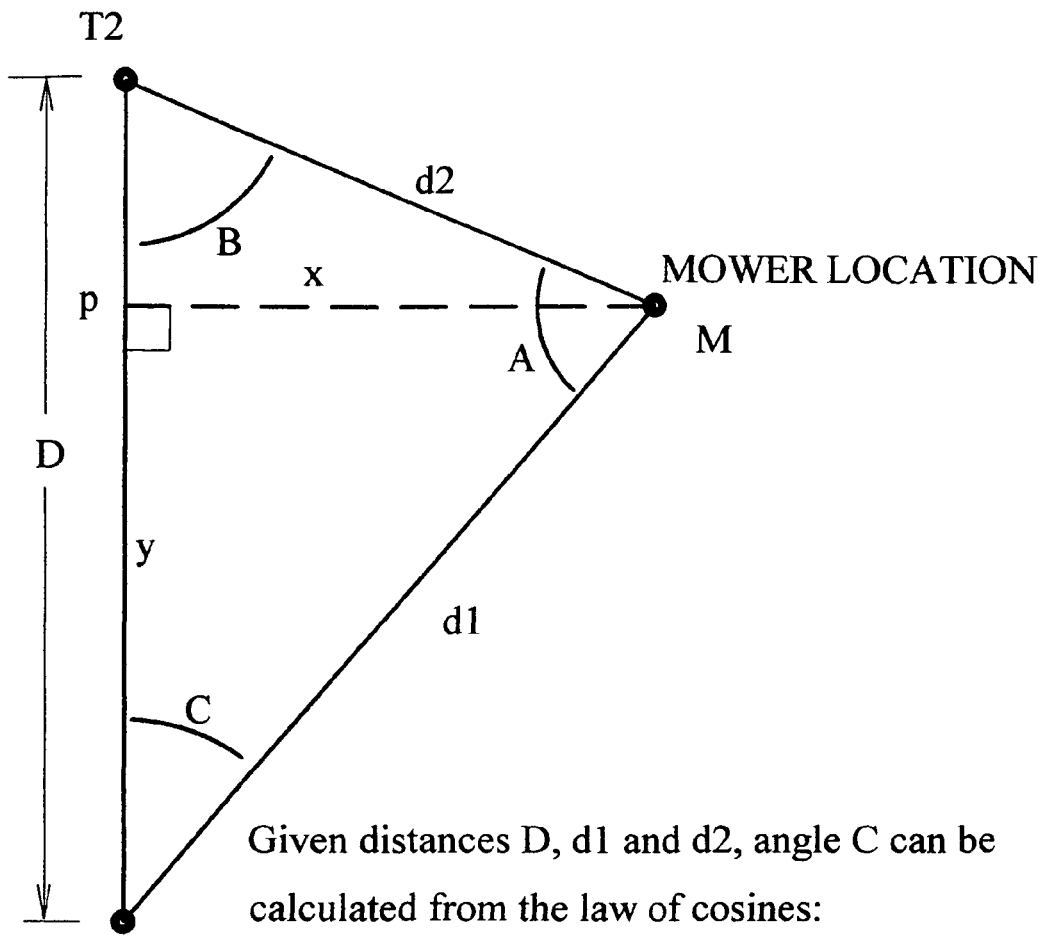
FIG. 4 is a diagram showing the locations of the transmitters and mower and the trigonometric relationships to calculate the (x,y) coordinate of the mower's location.

The diagram of FIG. 4 shows the arrangement of the two audio transmitters 16A and 16B designated here as T1 and T2 respectively, along with the position of the mower 12 designated as M. The distance D is a known distance between T1 and T2. The distance between T1 and mower M is designated by d1. Likewise the distance between T2 and mower M is designated by d2. The dashed line between mower M and point p is orthogonal to the line between T1 and T2, and represents the x distance of the coordinate to be determined. The distance from T1 and point p is the y distance of the coordinate. When the sides of the triangle formed by T1, T2, and M are known, angles A, B, and C can be determined from the trigonometric law of cosines. From that information the sine and cosine relationships are used to determine the value of x and y.

OPERATION

FIGS. 5 to 8

Figure 5:
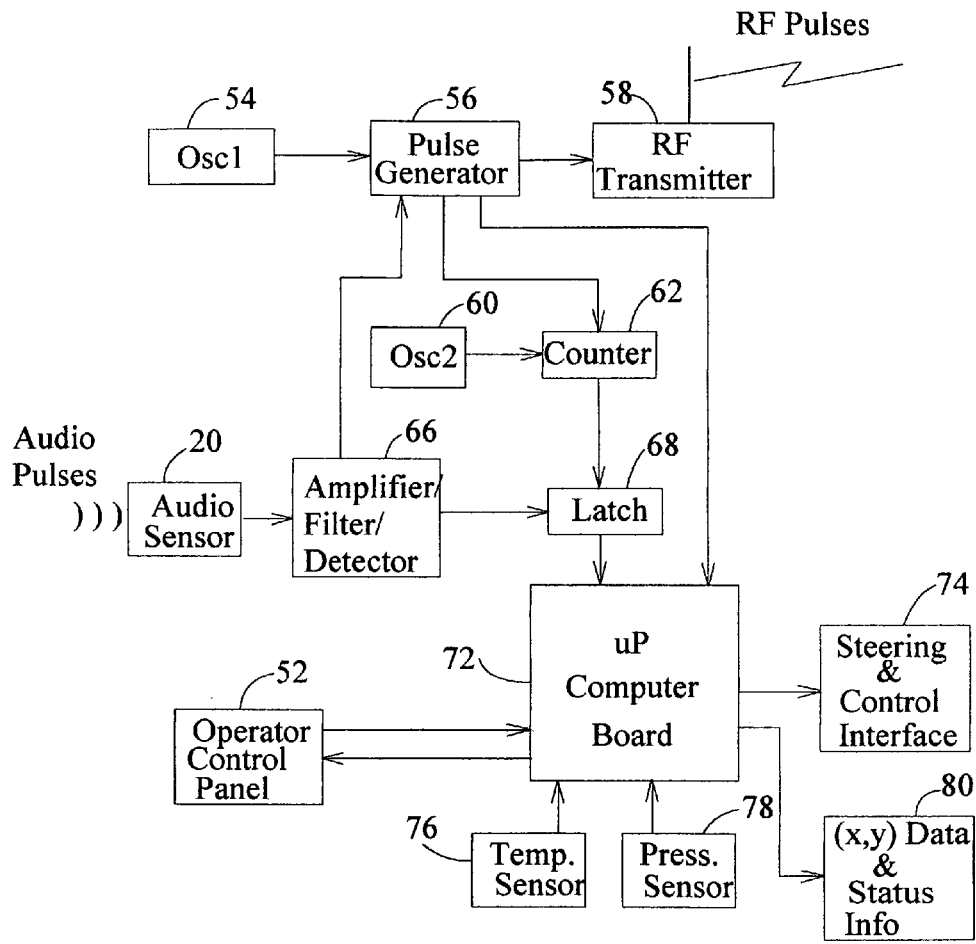
FIG. 5 is a functional diagram of the control system mounted on the mower.
Figure 7:
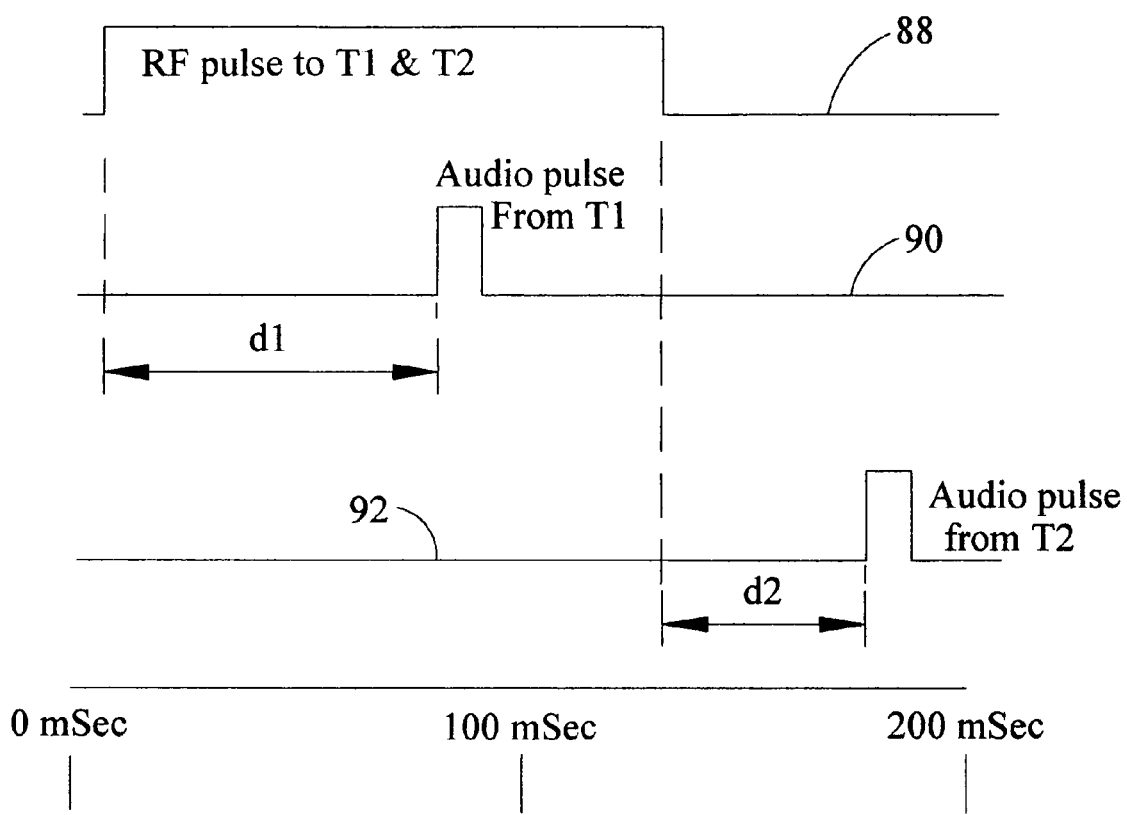
FIG. 7 is a pulse timing diagram of the preferred embodiment showing the relationship of the RF pulse to the audio pulses.

One implementation of generating the RF and audio pulses is shown in the functional block diagrams of FIGS. 5 and 6 along with the timing diagram of FIG. 7. In this method the RF receivers 82 in sonic transmitters 16A and 16B are tuned to the same frequency as the RF transmitter 58 on the mower 12. RF transmitter 58 is modulated with a frequency shift keyed (FSK) signal with a high frequency in the range of 25 Kilohertz representing a high level and a low frequency in the range of 100 Hertz for a low level, or vice versa. Use of frequencies this far apart make it very easy to utilize simple filters to detect, demodulate, and reconstruct a digital RF pulse 88 in FIG. 7 at the receiver end at the sonic transmitter. RF transmitters and receivers in the 900 MHz range such as the Linx Technologies models have a maximum time limit of 33 milliseconds that it must be modulated if using a digital modulating signal. This limit corresponds to a minimum baud rate specification of those receivers and transmitters. If that time is exceeded, the demodulated signal becomes erratic. But if analog modulation with the proper frequencies is used, this limitation is overcome and constitutes the novel feature that makes this operation successful and simple. The high level duration is set to a value that represents the maximum time representing the longest distance expected to be encountered in the area of the lawn, typically about 125 milliseconds. An oscillator 54 determines the timing for pulse generator 56. The T1 sonic transmitter 16A receives RF pulse 88 via an RF receiver 82 which is demodulated and shaped to trigger a burst pulse in audio pulse generator 84 on the rising edge of demodulated RF pulse 88. The audio pulse generator 84 then drives an acoustic speaker 44 which produces a burst of an audio pulse 90. On mower 12 the rising edge of RF pulse 88 also resets the counter 62 to zero by means of pulse generator 56. Upon receipt of the audio pulse 90 by the audio sensor 20 an amplifier, filter, and detector 66 effectively demodulates the signal and generates a digital pulse that grabs the value of a counter 62 by means of a latch 68. An oscillator 60 drives the counter 62 at a rate sufficient to provide a count representative of a resolution of distance to a fraction of an inch. The count is then read by computer board 72 and stored in a parameter that is used to calculate the distance d1. The second sonic transmitter 16B is set to produce an audio pulse 92 on the falling edge of the received RF pulse 88. The falling edge of RF pulse 88 on mower 12 also resets the counter 62 and similarly the reception of audio pulse 92 by the audio sensor 20 follows the same process to obtain the new value of counter 62 and store that count in another parameter that is used to calculate the distance d2. Because most RF receivers have a maximum time to receive an RF pulse before it loses integrity, this method of FSK modulating the RF transmitter with a constant amplitude audio frequency signal that is only frequency shifted, the integrity and reliability of receiving a valid signal is assured, and the same RF frequency and signal is received by both sonic transmitters thus simplifying the operation.

Now the microprocessor, computer board 72, has the needed information to perform the calculations given in the formulas shown in FIG. 4 to determine the x,y coordinate representing the location of the mower 12 of FIG. 1. This set of values is stored as a path point in an array or saved to memory in the form of a disk on chip on the microprocessor computer board 72. The process is repeated for each point as the mower is moved manually by remote control to form a path. In automatic mode, the stored path is compared to the measured path points to determine how to steer the mower to follow the recorded path. The digital logic drives the steering interface to perform that function.

The velocity of sound in air is roughly 1,129.45 feet per second depending upon temperature and humidity conditions. The measurements of d1 and d2 can be compensated for the variation in velocity caused by different temperatures according to the formula V=1,052.03+1.106×T, where V is the velocity of sound in air and T is the temperature in degrees Fahrenheit. A temperature sensor 76 is used to provide corrections for the speed of sound caused by temperature variations. A pressure sensor 78 is not required since velocity is independent of air pressure and only slightly dependent on humidity. Temperature compensations provide corrections for the variations of speed of sound for more accuracy and repeatability. The time it takes the RF pulses to travel from the mower 12 to the receivers in the audio transmitters 16A,B is negligible with respect to the time it takes the sound pulse to travel from the audio transmitters 16A,B to the mower 12.

Operator interface 52 is used to provide inputs to the microprocessor computer board 72 and to display status. The distance information D between sonic transmitters 16A and 16B is selected or keyed in via control panel 52. The software algorithms for automatically controlling and steering a lawn mower are the same as in my original patent. There are many other uses besides a lawn mower to which this invention can be applied, such as automated vacuum cleaners, powered garden equipment, and various types of robots and mobile platforms.

The audio sensor 20 of FIG. 5 is a plurality of condenser microphones 22 attached in a circular manner in audio sensor assembly 20, which provide for omni-directional reception of audio signals. The amplifier/filter/detector 66 incorporates an audio filter set to as narrow of a frequency as possible to eliminate the effects of noise in the ambient environment as well as noise generated by the mower engine.

The use of sound waves in the audible range is preferable to the ultrasonic range because of higher attenuation of ultrasonic frequencies in the air. However the implementation of this invention is not limited to the use of sound waves. The use of the electromagnetic spectrum or radio frequency is also possible with high technology using very high speed logic chips and would be useful for greater distances.

The duration of the audio pulses are short, on the order of 10 milliseconds or less. The RF high pulse that represents the maximum distances between transmitters and the mower is typically 125 milliseconds for a fifty foot square area. It is longer for larger areas. The cycle of repetition of the RF trigger pulse and audio response pulse is on the order of one second. The timing of each pair of pulses and its repetition rate is dependent on the maximum size of the lawn and the maximum distance that the audio response pulse can be detected. A one second repetition rate provides for one x,y data point per second which is sufficient for recording a path and following that path in automatic mode later.

Figure 8:
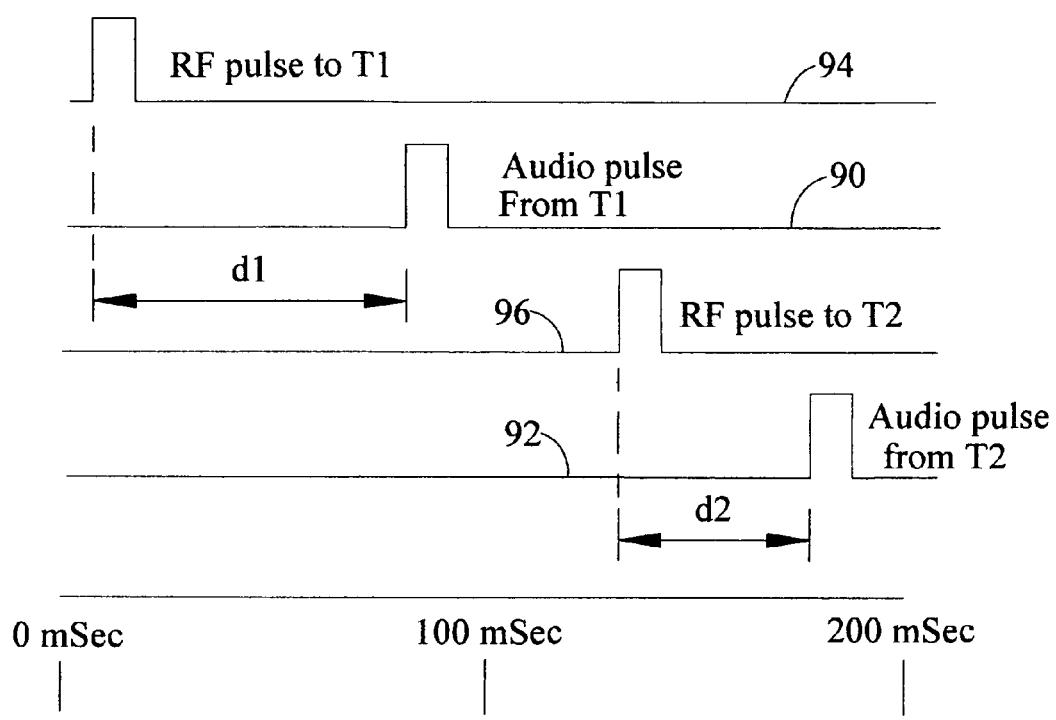
FIG. 8 is an alternate pulse timing diagram.

An alternate implementation of generating the RF and audio pulses is shown in FIG. 8. Here the only difference is that the system measures the distances d1 and d2 by transmitting a digitally modulated RF trigger pulse on different frequencies from the RF transmitter 58 shown in FIG. 5. The first RF pulse 94 is received by RF receiver 82 in sonic transmitter 16A which produces audio pulse 90. After reception of Audio pulse 90, RF pulse 96 is transmitted and received by sonic transmitter 16B which produces audio pulse 92. The operation of capturing the information and calculating distances d1 and d2 are the same as described above. This implementation would be good for smaller sized areas and the maximum time limit between received pulses for the receivers used is not exceeded.

Another implementation of FIG. 8 is to use only one RF transmitter on a single frequency and digitally modulate it at a maximum bit rate. A simulated RF pulse 94 can then be reproduced at sonic transmitter 16A by gating two or three pulses at RF transmitter 58 such that several bit periods are held at a high level which are recognized at sonic transmitter 16A using a shift register and a gate. When four or more high bits are received consecutively, RF pulse 94 is regenerated. Likewise RF pulse 96 is reconstructed in sonic transmitter 16B by gating a few pulses at RF transmitter 58 such that several bit periods are held at a low level which are recognized at sonic transmitter 16B. This implementation allows the use of a single RF frequency and avoids the problem of minimum baud rate for RF transmitters and receivers.

The operation of the system to record a path and running in automatic mode is similar to my previous patent. The difference in this invention is that there are only two audio transmitters 16A and 16B as shown in FIG. 1. The operator first places these transmitters a selected distance between them, turns them on and then enters that information into the system and selects the programming mode via control panel 52 on automatic mower 12. Using the manual controller 14, he maneuvers the mower to cut grass generally in the area of the sonic transmitters. When finished, he selects a file to store that information again via control panel 52. Multiple paths can be stored and when a lawn is to be cut automatically later on, the operator simply selects the proper file and depresses the go button to start the automatic process.

CONCLUSION, RAMIFICATIONS, AND SCOPE OF INVENTION

Thus the reader will see that the local positioning system of the various embodiments, because of its simplicity, is easy to implement and use, easy to manufacture, and thus less costly. Furthermore, this local positioning system has the additional advantages in that:

The number of required sonic transmitters are reduced to two, making the operation simpler.

The audio sensor on the mower is fixed, not rotating as in prior art thus increasing the reliability and life of the system.

Problems and errors caused by RF reflections and sonic reflections are eliminated because a depth of null means of detecting lines of sight is not used. Also because the sonic pulse is not a continuous beam, audio reflections do not have a chance to interfere with the original pulse received.

Accuracy of data is improved because of the ease of detecting the presence of a pulse instead of a depth of null.

A sequencing circuit is obviated because there is no directional loop antenna with a figure-eight pattern that requires it.

Unique radio frequencies are not needed to trigger the audio transmitters because of the method used to trigger each of them, thus reducing circuitry.

Only simple trigonometric formulas are needed to calculate the coordinate of the location without the complex simultaneous solutions of circle equations.

Modulating the RF transmitter by an analog FSK signal overcomes the time limitation of a minimum baud rate of digital pulse modulation.

Using the leading and lagging edges of the FSK signal to trigger the first and second sonic locating transmitters, respectively, permits the use of only one RF transmitting frequency.

It provides for shielding the omni-directional sonic sensor from ambient noise as well as vibrations from the lawn mower itself.

It eliminates the need for coding the RF triggering signals and eliminates interference of sonic reflections from area objects.

It eliminates the effects of Doppler frequency shift of a continuous sonic wave as well as the interferences of reflections.

It simplifies the operation by utilizing a one-way travel of sonic signals instead of two-way.

It eliminates the need for separate synchronization signals.

It provides a self contained system that does not rely on blue tooth standards, radio propagation parameters, accelerometers, odometers, or GPS systems.

It provides more flexibility by eliminating the use of proximity sensors and markers to define the working area.

While the above description contains many specificities, these should not be construed as limitations on the scope of the embodiments, but rather as providing illustrations of some of the presently preferred embodiments. Other variations are possible. For example the method of triggering the audio transmitters could be done by transmitting an RF pulse from the mower to the first audio transmitter on one frequency, and later transmitting another RF pulse on a different frequency to the second audio transmitter. Another example would be to use infrared trigger pulses from the mower to trigger the audio transmitters. Visible light could also be used with either method of triggering. Still another method of determining the distance instead of audio pulses could be the use of electromagnetic energy along with high speed circuitry to measure the time it takes for an RF pulse to be received at the mower. This implementation would be useful for larger areas that would exceed the useful limit of audio waves. Also, an alternate to measuring temperature with hardware, the value of temperature may be inputted directly via the control panel. The condenser microphones in the sonic sensor assembly could be one omni-directional microphone. The type of foam material in the separators could be various sizes, shapes, thickness, or material. It could even be a system of compression springs or plastic bubbles used in packing material. The support rod itself could be made out of semi-flexible material. The speaker in the some transmitters could be replaced with piezoelectric transducers similar to those used in loud smoke alarm detectors. The angle of projection from the sonic transmitters needs to be broad enough to cover the area to be traversed, typically 90 degrees. Therefore more than one speaker can be arranged to broaden that angle. An angle of 180 degrees would be needed for traversing the area on the mirror side. Audio power can be adjusted but only a sufficient amount of power to overcome mower and ambient noise should be used to prevent injury to the user's ears. Alternate to the use of gasoline power mowers, if an electric mower is used, there will be far less noise produced. Therefore less power will be required to drive the speakers, or piezo-electric transducers would be sufficient. The area of operation shown in the figures is on the right side of the two locating sonic transmitters, but operation can very easily be extended to the mirror side, the left side, by the proper algorithms in the processor thus doubling the effective operating area.

Accordingly, the scope of the embodiments should be determined not by the embodiments illustrated, but by the appended claims and their legal equivalents.

I claim:

1. A locating system for providing location data to an automated lawn mower comprising:
  (a) a first sonic transmitter configured to generate a sonic pulse in response to receipt of a first characteristic of a radio frequency signal transmitted from said lawn mower;
  (b) a second sonic transmitter configured to generate a sonic pulse in response to receipt of a second characteristic of said radio frequency signal transmitted from said lawn mower;
  (c) a radio frequency transmitter on said lawn mower configured to produce a radio frequency signal to be received by said sonic transmitters;
  (d) a sonic pulse sensor on said lawn mower capable of detecting a sonic pulse transmitted from each of said sonic transmitters;
  (e) a counter coupled to said sonic pulse sensor to determine the time of travel of each of said sonic pulses;
  (f) a temperature sensor for providing ambient temperature;
  (g) a processor connected to said counter and said temperature sensor to calculate lawn mower x-y coordinates from input data provided by said counter and said temperature sensor; and
  (h) a data output connected to said processor for providing temperature corrected location data to said lawn mower;
    wherein said first sonic transmitter includes a positive edge detector of said radio frequency signal and said second sonic transmitter includes a negative edge detector of said radio frequency signal.

2. The locating system of claim 1 wherein said radio frequency signal transmitted from said lawn mower is modulated by an analog frequency-shift keyed signal.

3. A method of determining the location of an automated lawn mower comprising the steps of:

(a) providing a plurality of sonic transmitters placed a certain distance apart at an area of lawn to be mowed and configured to be triggered by different characteristics of a modulated radio frequency signal transmitted from said automated lawn mower;

(b) sequentially triggering said sonic transmitters with said modulated radio frequency signal transmitted from said automated lawn mower, wherein the first of said sonic transmitters is triggered by the rising edge of said modulated radio frequency signal and the second of said sonic transmitters is triggered by the falling edge of said modulated radio frequency signal;

(c) individually measuring the time of flight of sonic pulses between each said sonic transmitter and said automated lawn mower;

(d) measuring ambient temperature to determine accurate distances corresponding to time of flight of each sonic pulse; and (e) calculating location coordinates relative to said sonic transmitters with values adjusted for ambient temperature;

whereby temperature corrected location coordinates are available at said automated lawn mower for recording or for automated operation.

* * * * *